2,716,663

HYDRAZIDES OF PHENYL SUBSTITUTED DIHYDROXYBENZOIC ACIDS

Floyd L. Heman, Midland, Mich., assignor to The Dow Chemical Company, Midland, Mich., a corporation of Delaware No Drawing. Application July 9, 1953, Serial No. 367,087

5 Claims. (Cl. 260—559)

This invention is concerned with the hydrazides and phenyl hydrazides of the phenyl substituted dihydrobenzoic acids and the acid addition salts of such compounds.

The hydrazides of the invention are characterized by the formula

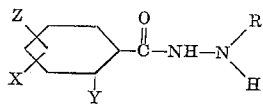

wherein R represents phenyl or hydrogen, X represents a phenyl radical, Y represents hydroxyl, and Z represents hydroxyl which is meta to the carbonyl group and in para to Y when X is meta to Y. These compounds are crystalline solids which are somewhat soluble in many organic solvents and of low solubility in water. The acid addition salts are crystalline solids which are readily soluble in many common organic solvents and water. The new compounds of the invention are valuable as intermediates for the preparation of more complex organic derivatives and as active toxic constituents of parasiticide compositions. Representative members of the new compounds have been found to be of particular value as active toxic constituents of germicide and disinfectant compositions of the control of *Salmonella typhosa* and *Staphylococcus aureus*.

The new hydrazide compounds may be prepared by reacting hydrazine hydrate ($N_2H_4 \cdot H_2O$) or phenyl hydrazine with a lower alkanol ester of a phenyl substituted dihydroxybenzoic acid in which one hydroxyl group is ortho to the carboxyl group, and the other hydroxyl is meta to the carboxyl group and is para to the first hydroxyl group when the phenyl group is meta to said first hydroxyl. The reaction may be carried out in an organic solvent or water as reaction medium and takes place smoothly at temperatures not in excess of about 105° C. and preferably not in excess of about 50° C. The reaction may be carried out when employing equimolar proportions of the reagents. However, it is generally preferred to employ an excess of the hydrazine hydrate or phenyl hydrazine reactant. Upon completion of the reaction, the reaction mixture is neutralized with a mineral acid such as hydrochloric acid and generally brought to a pH of 7 or somewhat less to form the water soluble mineral acid salt of the excess hydrazine reagent. During the neutralization, the desired hydrazide or phenyl hydrazide precipitates as a crystalline material. The product may be separated by filtration and washed with water to remove traces of unreacted hydrazine reagent. If desired, the product may be further purified by successive recrystallization from (1) a suitable organic solvent and (2) from water.

The said addition salts of the new hydrazides and phenyl hydrazides such as the hydrobromides, hydrochlorides, phosphates, sulfates, acetates, benzoates, succinates, tartrates, and other addition salts may be readily prepared by allowing the hydrazide or phenyl hydrazide to react with the desired acid in a solvent such as diethyl ether. Upon evaporation of the solvent the salt is obtained as a crystalline residue. The latter may be further purified by recrystallization from suitable organic solvents.

The following examples are given to illustrate one manner which may be used to prepare the compounds of the invention, but are not to be construed as limiting:

Example 1.—3-phenyl-2,5-dihydroxybenzoic acid hydrazide 50 grams (0.205 mole) of methyl 3-phenyl-2,5-dihydroxybenzoate, 60.6 grams of aqueous 85 per cent hydrazine hydrate (equivalent to about 1.03 moles of $N_2H_4 \cdot H_2O$) and 80 milliliters of methanol were mixed together with stirring at a temperature somewhat below 30° C. In order to control the temperature, the latter operation was carried out with cooling. Stirring was then continued for about 2 hours and the reaction mixture thereafter diluted with 125 milliliters of water and set aside overnight. The mixture was then neutralized with concentrated hydrochloric acid, a 3-phenyl-2,5-dihydroxybenzoic acid hydrazide product precipitating as a crystalline solid. The latter was separated by filtration, washed with water, dried and found to melt at 174°–175° C.

Example 2.—6-phenyl-2,5-dihydroxybenzoic acid hydrazide 0.3 mole of methyl 6-phenyl-2,5-dihydroxybenzoate and 1.0 mole of hydrazine hydrate and 100 milliliters of isopropanol are mixed together with stirring and cooling and at a temperature somewhat below 35° C. Stirring is then continued for a period of about 3 hours and the reaction mixture thereafter diluted with 150 milliliters of water and set aside overnight. The mixture is then neutralized with concentrated hydrochloric acid. During the neutralization a 6-phenyl-2,5-dihydroxybenzoic acid hydrazide product precipitates as a crystalline solid and is separated by filtration.

Example 3.—4-phenyl-2,5-dihydroxybenzoic acid hydrazide 50 grams (0.205 mole) of methyl 4-phenyl-2,5-dihydroxybenzoic acid, 60.6 grams of aqueous 85 per cent hydrazine hydrate (equivalent to 1.03 moles of $N_2H_4 \cdot H_2O$) and 80 milliliters of methanol were mixed together with stirring at a temperatures of about 30° C. In order to control the temperature, the latter operation was carried out with cooling. Stirring was then continued for about 2 hours and the reaction mixture thereafter diluted with 125 milliliters of water and set aside overnight. Following the latter period, the reaction mixture was neutralized with concentrated hydrochloric acid to precipitate a 4-phenyl-2,5-dihydroxybenzoic acid hydrazide product as a crystalline material. The latter was separated, washed with water and dried. This product had a melting point of 201°–203° C.

Example 4.—5-phenyl-2,3-dihydroxybenzoic acid hydrazide 12.2 grams (0.05 mole) of methyl 5-phenyl-2,3-dihydroxybenzoate, 12.5 grams (0.24 mole) of hydrazine hydrate were mixed together with stirring and at a temperature somewhat below 40° C. and the resulting mixture set aside for about three days at room temperature. The reaction mixture was then filtered and the filtrate neutralized with 5-normal hydrochloric acid. During the neutralization, 5-phenyl-2,3-dihydroxybenzoic acid hydrazide precipitated as a crystalline solid and was separated by filtration. The latter had a melting point of 197.5°–198.5° C.

Example 5.—4-phenyl-2,5-dihydroxybenzoic acid phenyl hydrazide hydrochloride 11.8 grams (0.05 mole) of methyl 4-phenyl 2,5-dihydroxybenzoate and 10.8 grams (0.1 mole) of phenyl hydrazine were mixed together and the resulting mixture heated with stirring for about 22 hours and at a temperature of 100° C. The reaction mixture was then diluted with 200 milliliters of water and the resulting mixture treated with a small amount of concentrated hydrochloric acid to neutralize the excess phenyl hydrazine reagent. During the hydrochloric acid addition, a 4-phenyl-2,5-dihydroxybenzoic acid phenyl hydrazide product precipitated as a crystalline material. The latter was separated by filtration, washed with water and dried. The dried product was dissolved in 400 milliliters of diethyl ether and filtered. Gaseous hydrogen chloride was then bubbled into the above filtrate over a period of about 3 minutes. During the latter operation, a 4-phenyl-2,5-dihydroxybenzoic acid phenyl hydrazide hydrochloride product precipitated as a crystalline solid. The latter was separated by filtration, washed with ether and dried. The dried product had a melting point of 122°–124° C.

Example 6.—4-phenyl-2,5-dihydroxybenzoic acid phenyl hydrazide 0.5 milliliter of aqueous 30 per cent sodium hydroxide was added dropwise to 0.5 gram of the above 4-phenyl-2,5-dihydrozybenzoic acid hydrochloride dissolved in 50 milliliters of water. During the caustic addition, a 4-phenyl-2,5-dihydroxybenzoic acid phenyl hydrazide product precipitated as a crystalline solid and was separated by filtration, washed with water and dried. The dried product melted at 120°–122° C.

Example 7.—3-phenyl-2,5-dihydroxybenzoic acid hydrazide hydrochloride 0.5 gram of 3-phenyl-2,5-dihydroxybenzoic acid hydrazide was dissolved in 150 milliliters of diethyl ether and gaseous hydrogen chloride bubbled into the resulting solution over a period of about 3 minutes. During the hydrogen chloride addition, a 3-phenyl-2,5-dihydroxybenzoic acid hydrazide hydrochloride product precipitated as a crystalline solid and was separated by filtration and dried. The dried product had a melting point of 199°–201° C.

Example 8.—3-phenyl-2,5-dihydroxybenzoic acid hydrazide sulfate

About 2 milliliters of concentrated sulfuric acid was dissolved in about 25 milliliters of diethyl ether and the resulting mixture added dropwise with stirring to 0.5 gram of 3-phenyl-2,5-dihydroxybenzoic acid hydrazide dissolved in 150 milliliters of diethyl ether. During the addition, a 3-phenyl-2,5-dihydroxybenzoic acid hydrazide sulfate product precipitated as a crystalline solid. In the above operation, the sulfuric acid-diethyl ether solution was added dropwise until no further precipitation of the desired salt occurred with further addition of the sulfuric acid reagent. The 3-phenyl-2,5-dihydroxybenzoic acid hydrazide sulfate product was then separated by filtration, washed with diethyl ether, dried and the dried product found to melt at 198°–199° C.

The alkyl esters of the phenyl substituted dihydroxybenzoic acids employed as starting materials, as previously described, may be prepared by reacting a suitable phenyl substituted dihydroxy benzoic acid with a lower alcohol in the presence of a small amount of an esterifying agent such as sulfuric acid. The reaction takes place smoothly at temperatures in excess of about 45° C. The desired esters are crystalline solids and may be separated in conventional fashion, e. g. washing with water, washing with dilute aqueous sodium carbonate and recrystallization from various organic solvents. The latter esters and methods for their production constitute the subject matter of my copending application, Serial No. 367,102, filed concurrently herewith.

The phenyl substituted dihydroxybenzoic acids, as above employed, may be prepared by hydrolyzing a suitable halogenated phenyl-2-hydroxybenzoic acid compound in aqueous sodium hydroxide. In carrying out the reaction, an aqueous sodium hydroxide solution of the benzoic acid compound is heated for a period of time at a temperature of from 50°–180° C. Following the reaction, the reaction mixture is acidified with a mineral acid. During the acidification, the desired benzoic acid compound precipitates as a crystalline solid and may be separated by filtration. The latter compounds and methods for their preparation constitute the subject matter of my copending application, Serial No. 367,102, filed concurrently herewith.

I claim:
1. 3-phenyl-2,5-dihydroxybenzoic acid hydrazide.
2. 4-phenyl-2,5-dihydroxybenzoic acid hydrazide.
3. 5-phenyl-2,3-dihydroxybenzoic acid hydrazide.
4. 4-phenyl-2,5-dihydroxybenzoic acid phenyl hydrazide hydrochloride.
5. A compound selected from the group consisting of (a) the hydrazides and phenyl hydrazides of 3-phenyl-2,5-dihydroxybenzoic acid, 4-phenyl-2,5-dihydroxybenzoic acid, 5-phenyl - 2,3 - dihydroxybenzoic acid and 6-phenyl-2,5-dihydroxybenzoic acid, and (b) the acid addition salts of said hydrazides and phenyl hydrazides.

No references cited.